US010389825B2

(12) United States Patent
Yang et al.

(10) Patent No.: US 10,389,825 B2
(45) Date of Patent: Aug. 20, 2019

(54) NETWORK DEVICE IDENTIFICATION IN AN INDUSTRIAL CONTROL NETWORK

(71) Applicant: Cisco Technology, Inc., San Jose, CA (US)

(72) Inventors: Xuechen Yang, Austin, TX (US); Rudy Klecka, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/720,973

(22) Filed: Sep. 29, 2017

(65) Prior Publication Data

US 2018/0027081 A1   Jan. 25, 2018

Related U.S. Application Data

(63) Continuation of application No. 14/597,800, filed on Jan. 15, 2015, now Pat. No. 9,819,748.

(51) Int. Cl.
*G06F 15/177* (2006.01)
*H04L 29/08* (2006.01)
*H04L 29/12* (2006.01)

(52) U.S. Cl.
CPC .......... *H04L 67/16* (2013.01); *H04L 61/2015* (2013.01); *H04L 61/3025* (2013.01); *H04L 61/609* (2013.01)

(58) Field of Classification Search
CPC ...... H04L 61/30; H04L 61/2015; H04L 67/16
See application file for complete search history.

(56) References Cited

U.S. PATENT DOCUMENTS

| 6,286,038 B1 * | 9/2001 | Reichmeyer ........ H04L 41/0213 709/220 |
| 8,060,619 B1 | 11/2011 | Saulpaugh et al. ........... 709/227 |
| 9,819,748 B2 | 11/2017 | Yang et al. |

(Continued)

FOREIGN PATENT DOCUMENTS

WO    WO 2005/114604 A2    12/2005    ............. G08B 13/14

OTHER PUBLICATIONS

Stapp, M. et al., Cisco Systems, Inc., "The Dynamic Host Configuration Protocol (CHCP) Client Fully Qualified Domain Name (FQDN) Option." Network Working Group, Request for Comments: 4702. Oct. 2006. pp. 1-17.

(Continued)

*Primary Examiner* — Yves Dalencourt
(74) *Attorney, Agent, or Firm* — Campbell Stephenson LLP

(57) ABSTRACT

In one embodiment, a system and method are disclosed for receiving, at a first network routing element, a discovery message sent via a network, where the discovery message comprises identifying information that identifies a physical location of a first network device. The method modifies the identifying information in the discovery message by adding additional information to the identifying information, where the additional information can, for example, identify a physical location of the first network routing element. Subsequent to modifying the identifying information, the method forwards the discovery message to a network element, where the network element can be, for example, either a second network routing element or a server.

20 Claims, 9 Drawing Sheets

(56) References Cited

U.S. PATENT DOCUMENTS

| | | | |
|---|---|---|---|
| 2005/0253722 A1* | 11/2005 | Droms | G08B 13/2402 340/572.1 |
| 2008/0092213 A1 | 4/2008 | Wei | 726/4 |
| 2012/0089713 A1* | 4/2012 | Carriere | H04L 12/4641 709/222 |
| 2014/0215034 A1 | 7/2014 | Chen | 709/221 |

OTHER PUBLICATIONS

Van Der Stok, P., and K. Lynn, "Building Control Requirements; draft-vanderstok-dnssd-building-requirements-00," Internet Draft. Oct. 17, 2013. pp. 1-17.

* cited by examiner

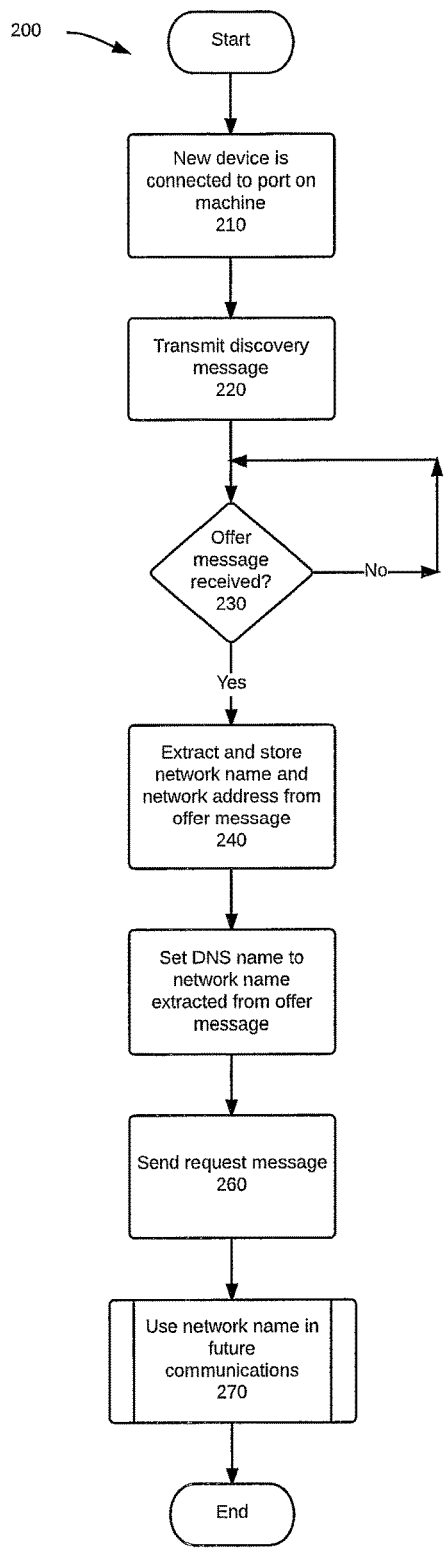

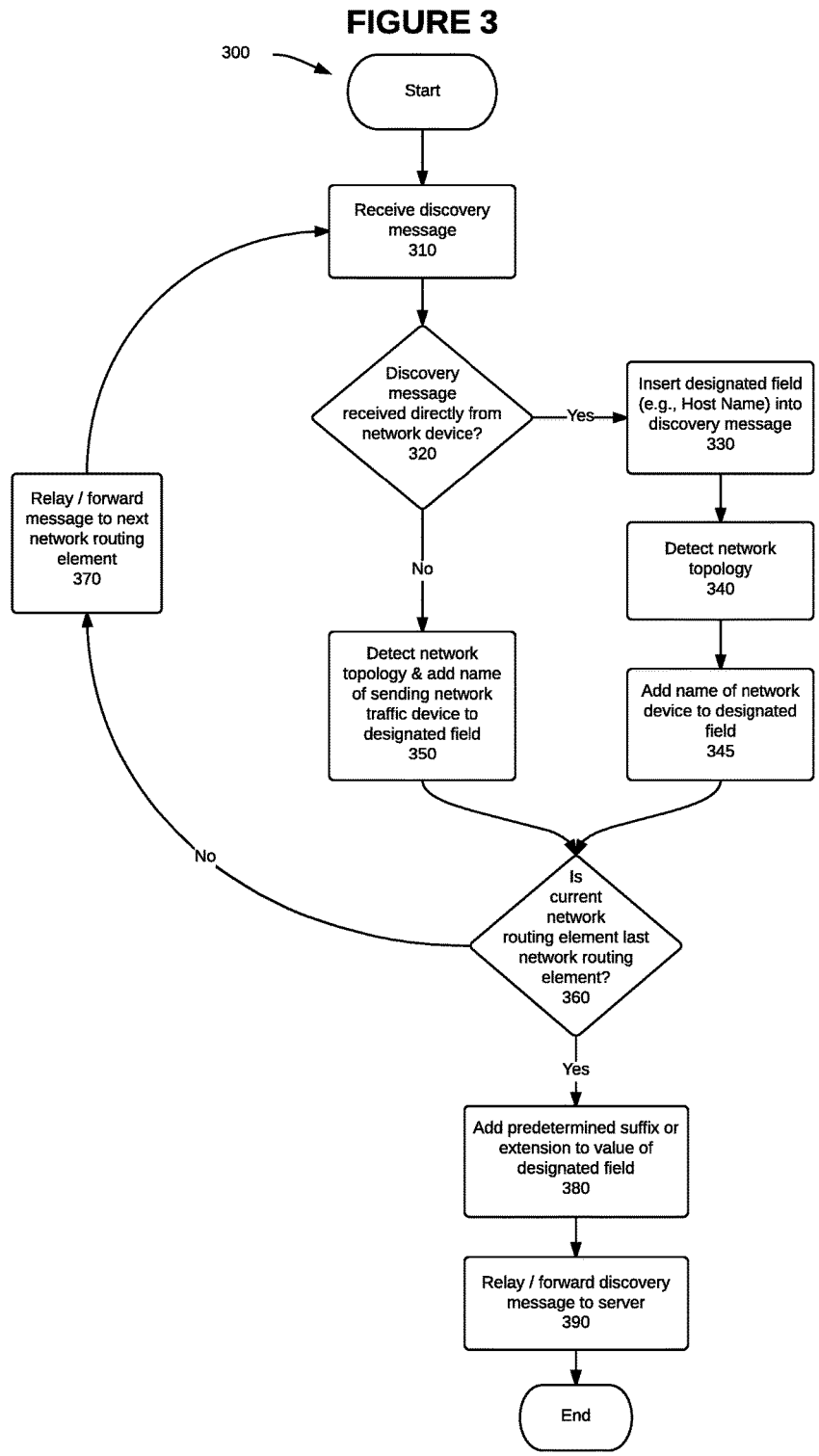

NETWORK DEVICE IDENTIFICATION IN AN INDUSTRIAL CONTROL NETWORK

CROSS-REFERENCE TO RELATED APPLICATIONS

The present patent application is a continuation of U.S. patent application Ser. No. 14/597,800, filed on Jan. 15, 2015, entitled "Network Device Identification in an Industrial Control Network," and which is incorporated by reference herein in its entirety and for all purposes as if completely and fully set forth herein.

FIELD OF THE INVENTION

This disclosure generally relates to the field of industrial control networks, and more specifically to the automated identification of a network device in an industrial control network.

BACKGROUND OF THE INVENTION

Networks can be used for many purposes, including for the control of machines such as those used in manufacturing and assembly lines. Such networks may contain many such machines, each containing multiple components. When those components break, fail, or otherwise stop working, they must be replaced and then reconnected to the network. This process is tedious and error prone, and the resulting downtime is typically expensive, in terms of the costs of repair, lost production, and the like.

BRIEF DESCRIPTION OF THE DRAWINGS

Embodiments such as those described herein may be better understood, and its numerous objects, features and advantages made apparent to those skilled in the art by referencing the accompanying drawings.

FIG. 2 is a flowchart that illustrates actions that can be performed by a network device in order to discovery and request a network address and host name, according to one embodiment.

FIG. 3 is a flowchart that illustrates actions that can be performed by network routing elements in order to automatically determine the host name of a newly added network device, according to one embodiment.

Figure 1A:
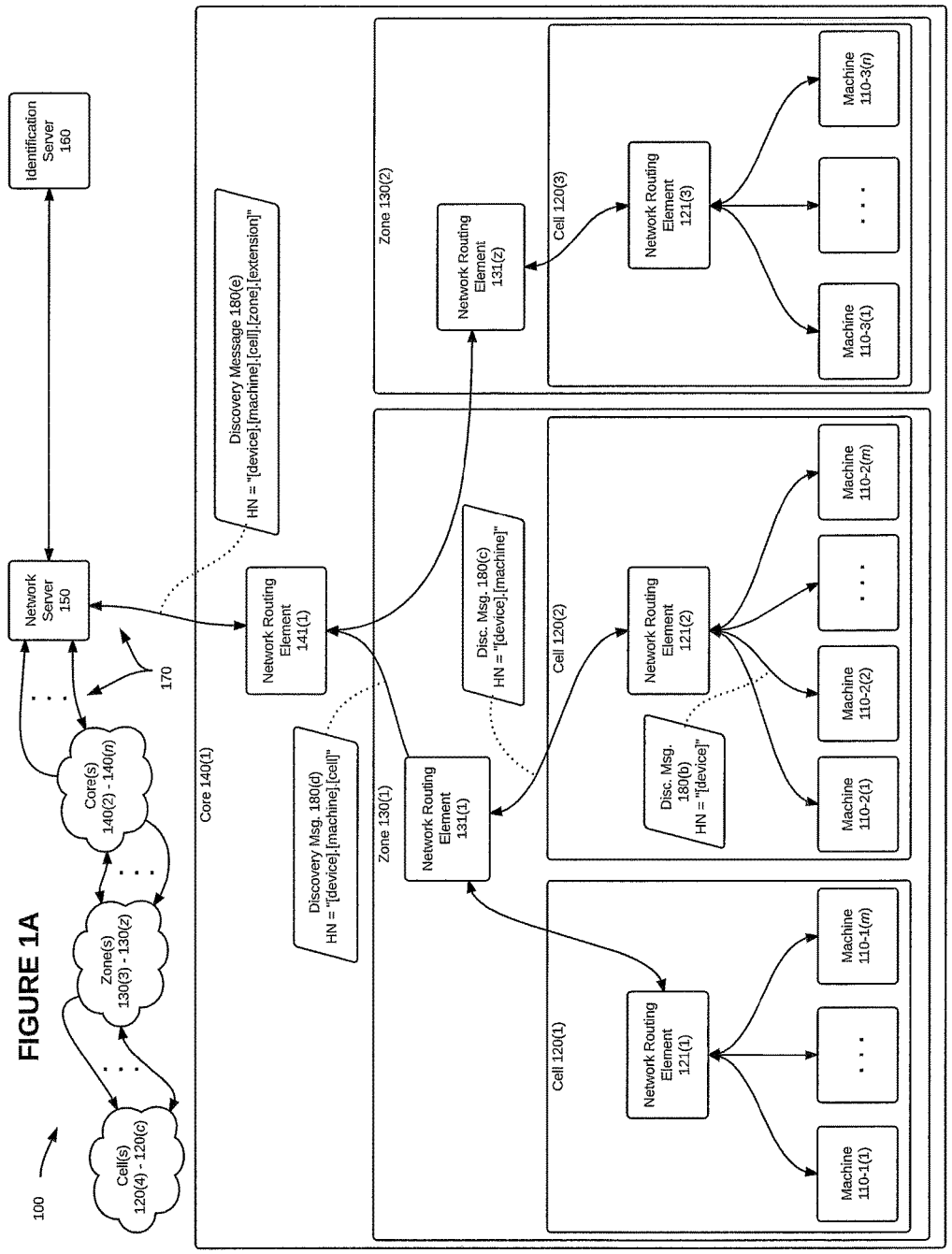
FIG. 1A is a block diagram of an industrial control network, including various machines, levels of organization (e.g., cells, zones, cores, etc.), and servers, as well as a discovery message at various stages.

While the methods and systems described herein are susceptible to various modifications and alternative forms, specific embodiments thereof are provided as examples in the drawings and detailed description. It should be understood that the drawings and detailed description are not intended to limit such embodiments to the particular form(s) disclosed. Instead, the intention is to cover all modifications, equivalents and alternatives falling within the spirit and scope of the appended claims.

DETAILED DESCRIPTION

Overview

Disclosed herein are various systems and methods for the dynamic creation, assignment and use of information identifying a network device (e.g., by way of network names and network addresses of network devices). For example, one method involves sending a discovery message, receiving an offer message including various information (e.g., network name information and network address information), and using that information to communicate with other network devices. Another example includes receiving a discovery message, adding information (e.g., location on a network), and forwarding that message to another device. In another aspect, a device may receive a discovery message containing information (e.g., information related to the location of a device within a network's topography), use that information to determine what network name should be offered to a requesting device, and use that information to offer that network name to a requesting device.

Industrial Control Networks

As the modern economy continues to rely more heavily upon automation, the industrial control networks that drive that automation continue to grow in importance. Unlike networks that focus on processing data (e.g., enterprise networks and data center networks), industrial control networks are often used to automate manufacturing processes that manufacture products such as, e.g., automobiles and pharmaceuticals. Thus, the problems faced by industrial control networks, as well as to the solutions to those problems, often differ significantly from the issues pertaining to data networks (e.g., enterprise networks and data center networks).

Industrial control networks differ from data networks in various meaningful ways. Among other differences, the devices that constitute an industrial control network tend to have very specific roles within the network (e.g., welding a specific part of a specific automobile in a specific manner), and can also be expensive. Moreover, due to the limited physical space on the floor of an assembly line plant, deploying large numbers of any given physical device is simply not practicable. As a result, industrial control networks tend to have much less redundancy than other types of networks, such as data networks.

Additionally, industrial control networks are generally used to manufacture specific products in specific ways. For instance, in the assembly of a car, the given steps in the assembly process are performed in a specific order and therefore each step is performed at a specific location on the assembly line. As another example, pharmaceuticals are typically manufactured using the same, very-precise process used to secure government approval for the pharmaceutical product. Due to such constraints, and unlike other types of networks, industrial control networks tend to be rigid in their function and topology. That is, once industrial control networks are designed and deployed, their topology is generally static, with changes being infrequent or nonexistent.

As a result of these differences, industrial control networks also face different problems that require different solutions than are present with other types of networks. For instance, if a single node fails in a large enterprise data network, there may be hundreds if not thousands of comparable nodes that can help offset the temporary loss of the failed node. As a result, the need to repair the failed node tends not to be particularly time sensitive, as the network can largely continue to function at (or very close to) full capacity even without the failed node.

As mentioned above, however, the nature of industrial control networks does not allow for such robust, built-in redundancy. Rather than having hundreds or thousands of devices that can perform a given role within the network, industrial control networks often only have, at most, a handful of devices assigned to any given step in an assembly or manufacturing process. For instance, a typical automobile assembly line may only have five devices that are assigned to weld a specific part at a specific step of an assembly line. If one of those devices fails, the network immediately faces up to a 20% loss in throughput capacity. In a finely-tuned industrial control network, this change in production speed and throughput at one location can create bottlenecks at upstream network locations, and wasted production capacity at downstream network locations. Moreover, in some situations, a given device may be the only device assigned to a specific role. If such a device fails, then the network grinds to a complete halt until that device is replaced.

Such delays can be quite costly to a company. For instance, some modern automobile assembly lines can produce about one vehicle per minute. With the cost an automobile often being upwards of $20,000, a company can face lost revenues in the tens of thousands of dollars for every minute that an assembly line is not working at full capacity. Thus, there exists a very real need to replace a failed device and return the network to full capacity as quickly as possible.

Automated Industrial Control Network

An industrial control network can include various components organized in various ways. Using the industrial control network depicted in FIGS. 1A and 1B as an example, one embodiment of an industrial control network can include multiple devices organized into machines, and multiple levels of organization of those machines (such as, e.g., cells, zones, and cores). A machine can include a group of devices, generally working towards a common goal, such as, e.g., welding a portion of an automobile or filling a bottle of pharmaceutical pills. Each device can be a network device, such as, e.g., an I/O device, a Programmable Logic Controller (PLC), a Human-Machine Interface (HMI), or any other type of device that can be used in an industrial control network. Each machine can also include (or be connected to) a network routing element (e.g., a hub, router, switch, or similar device) that can be used to direct network traffic (e.g., data packets) associated with that machine. As used herein, a cell can be thought of as a group of machines and a zone can be viewed as a group of cells, while a core can be viewed as a group of zones. Each level of organization (e.g., each cell, zone, and core) can also include (or be connected to) a network routing element that can be used to direct network traffic associated with that particular hierarchical level of organization. Other naming conventions and levels of organization are possible in accordance with this disclosure.

Each machine in a cell of machines may deploy the same group of devices in the same topology as each other machine in that cell, with that topology being repeated across the entire industrial control network. That is, each cell can be identical to each other cell, each zone can be identical to each other zone, and so forth. Conversely, the topology of one machine, cell, zone, core, or other level of organization can vary from that of another corresponding level of organization in the industrial control network. As an example of such configurations, in one embodiment, the topology of each machine within a cell may be identical to the topology of each other machine in that same cell. In one embodiment, each cell may include one or more machines that are different from the other machine(s) in that cell, but where the topology and configuration of that cell is repeated across multiple cells. For example, a cell may contain two or more machines that are different from each other (e.g., one welding machine and one painting machine), but those machines may nevertheless correspond to the machines in other cells. Many other configurations and topologies will be apparent in light of the present disclosure, and are intended to fall within the scope thereof.

As is the case with many types of machines, the components of a machine in an industrial control network may fail (e.g., break, stop working as intended, etc.). Replacing a failed network device (e.g., I/O block, welding arm, servo, etc.) has, heretofore, been a time-consuming and tedious process. When such a network device failed, a technician might, for example, receive a message (e.g., a text message or email) indicating that a device with a given network address (e.g., 192.168.1.17) has failed. The technician would then have to manually look up that network address (such as in a spreadsheet) to determine the corresponding type of device. The technician would also have to determine the physical location of that device within a network that is often extensive (e.g., an automobile assembly line) and which may often span multiple rooms (e.g., paint room, welding room, etc.) in a large building. Once the technician determined the specific type of device that failed, a replacement part had to be retrieved from storage and transported to the physical location of the failed device. The technician then manually removed the failed device and manually replaced the failed device with the new network device.

As part of the replacement process, the replacement device had to be assigned a network address manually, such that the replacement device could communicate with the rest of the network (and vice versa). While a network address can be set either statically or dynamically, such manual operations have their drawbacks, and unnecessarily increase the time needed to return an industrial control network (e.g., assembly line) to full capacity. The disclosure provided herein solves such problems, among others, by automatically creating a Domain Name System ("DNS") name for a networking device based on the physical location of that networking device within the network topology (that being a consideration in such environments). As will be described in more detail below, methods and systems such as those disclosed herein can be used to automate the configuration and provisioning of an industrial control network without requiring any changes in the network topology.

Figure 1B:
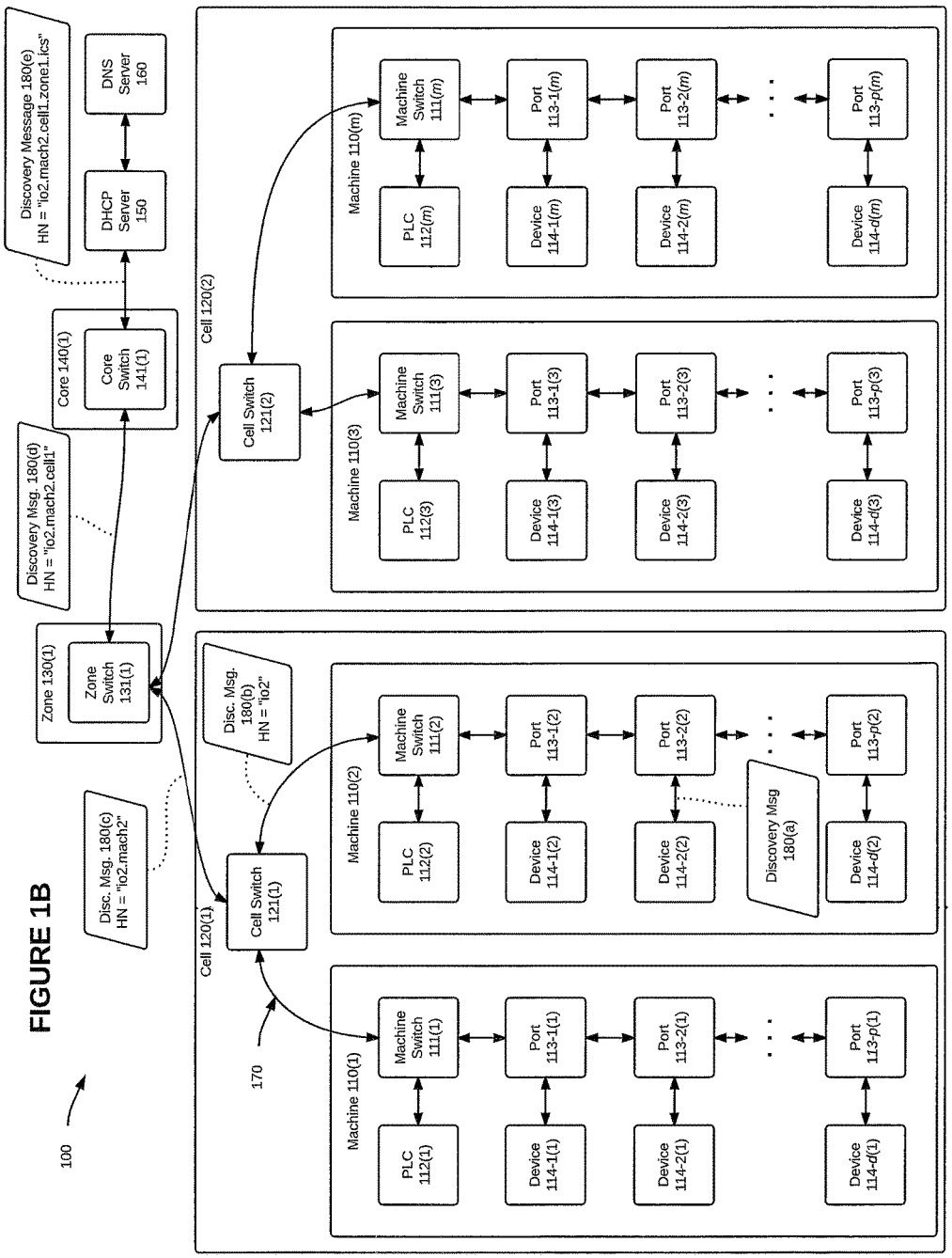
FIG. 1B is a block diagram showing additional details of the industrial control network depicted in FIG. 1A.

FIGS. 1A and 1B show a network diagram of an automated industrial control network. These figures more specifically depict an example of an industrial control network, such as an industrial control network 100. As can be seen from FIG. 1A, industrial control network 100 is connected in a tree-like structure via a network 170. At the lowest level of the tree, FIG. 1A depicts a plurality of machines 110, e.g., machine 110-1(1) through machine 110-c(m), where the letter "m" is a variable that represents the number of machines in any given cell, and the letter "c" is a variable that represents the number of cells in any given zone. As depicted in FIGS. 1A and 1B, machine 110 are organized into a plurality of cells 120, e.g., cell 120(1) through cell 120(c). Similarly, cells 120 are organized into a plurality of zones 130, e.g., zone 130(1) through zone 130(z), where the letter "z" is a variable that represents the number of zones in any given core. Additionally, zones 130 are organized into a plurality of cores 140, e.g., core 140(1) through core 140(n), where the letter "n" is a variable that represents the number of cores in any given industrial control network. Although not expressly depicted in FIG. 1A (due to space limitations), the various zones 130(3)-130(z) in cores 140(2)-140(n) may each contain one or more zones 130, and each of those zones 130 may contain one or more machines 110.

Although not expressly depicted in FIGS. 1A and 1B, many of the components depicted in FIGS. 1A and 1B can be thought of as having a designated "name," as well as a predetermined naming convention that is to be used when determine the host name of each component. To facilitate the present discussion, the names of some (but not all) of those components are provided in Table 1, below. Although somewhat generic names are used for ease of following the examples in this disclosure, in practice a system could (and in some cases, preferably) use names that are more descriptive of each given component. Thus, for example, each cell may include a "Welding Machine" or "Welder" instead of a "Machine 1," and each of those "Welding Machines" may include network devices such as "Voltage Sensor" and "Welding Arm" instead of "Device 1" and "Device 1." Thus, while the names below are examples that help facilitate the discussion herein, such names should not be viewed as limiting the scope of the present disclosure in any way.

TABLE 1

| Element | Component Type | Location | Descriptive Name | Network Name |
|---|---|---|---|---|
| 110(1) | Machine | Cell 120(1) | "Machine 1" | mach1 |
| 110(2) | Machine | Cell 120(1) | "Machine 2" | mach2 |
| 110(3) | Machine | Cell 120(2) | "Machine 1" | mach1 |
| 110(m) | Machine | Cell 120(2) | "Machine 2" | mach2 |
| 112(1) | PLC | Machine 110(1) | "PLC" | plc |
| 112(2) | PLC | Machine 110(2) | "PLC" | plc |
| 112(3) | PLC | Machine 110(3) | "PLC" | plc |
| 112(m) | PLC | Machine 110(m) | "PLC" | plc |
| 113-1(1) | Port | Machine 110(1) | "Port 1" | port1 |
| 113-2(1) | Port | Machine 110(1) | "Port 2" | port2 |
| 113-p(1) | Port | Machine 110(1) | "Port p" | port_p |
| 113-1(2) | Port | Machine 110(2) | "Port 1" | port1 |
| 113-2(2) | Port | Machine 110(2) | "Port 2" | port2 |
| 113-p(2) | Port | Machine 110(2) | "Port p" | port_p |
| 113-1(3) | Port | Machine 110(3) | "Port 1" | port1 |
| 113-2(3) | Port | Machine 110(3) | "Port 2" | port2 |
| 113-p(3) | Port | Machine 110(3) | "Port p" | port_p |
| 113-1(m) | Port | Machine 110(m) | "Port 1" | port1 |
| 113-2(m) | Port | Machine 110(m) | "Port 2" | port2 |
| 113-p(m) | Port | Machine 110(m) | "Port p" | port_p |
| 114-1(1) | Network Device | Machine 110(1) | "I/O Device 1" | io1 |
| 114-2(1) | Network Device | Machine 110(1) | "I/O Device 2" | io2 |
| 114-d(1) | Network Device | Machine 110(1) | "I/O Device d" | io_d |
| 114-1(2) | Network Device | Machine 110(2) | "I/O Device 1" | io1 |
| 114-2(2) | Network Device | Machine 110(2) | "I/O Device 2" | io2 |
| 114-d(2) | Network Device | Machine 110(2) | "I/O Device d" | io_d |
| 114-1(3) | Network Device | Machine 110(3) | "I/O Device 1" | io1 |
| 114-2(3) | Network Device | Machine 110(3) | "I/O Device 2" | io2 |
| 114-d(3) | Network Device | Machine 110(3) | "I/O Device d" | io_d |
| 114-1(m) | Network Device | Machine 110(m) | "I/O Device 1" | io1 |
| 114-2(m) | Network Device | Machine 110(m) | "I/O Device 2" | io2 |
| 114-d(m) | Network Device | Machine 110(m) | "I/O Device d" | io_d |
| 120(1) | Cell | Zone 130(1) | "Cell 1" | cell1 |
| 120(2) | Cell | Zone 130(1) | "Cell 2" | cell2 |
| 120(3) | Cell | Zone 130(2) | "Cell 1" | cell1 |
| 120(c) | Cell | Zone 130(z) | "Cell c" | cell_c |
| 130(1) | Zone | Core 140(1) | "Zone 1" | zone1 |
| 130(2) | Zone | Core 140(1) | "Zone 1" | zone1 |
| 130(z) | Zone | Core 140(n) | "Zone z" | zone_z |
| 140(1) | Core | Network 100 | "Core 1" | core1 |
| 140(2) | Core | Network 100 | "Core 2" | core2 |
| 140(n) | Core | Network 100 | "Core n" | core_n |

As can be seen in Table 1, e.g., various letters (e.g., "p", "d", "m", "c", "z", and "n") are used throughout this disclosure to indicate a variable number of components (e.g., ports, devices, machines, cells, zones, and cores). For example, a variable number m of machines 110 may be implemented in each of a variable number c of cells. Each of those m machines 110 may contain a variable number p of ports 113, and may have a variable number d of network devices 114 connected to those ports. Although these letters are used in describing a variable number of instances of each of these different devices and components, a repeated use any of these variable letters does not necessarily indicate that each component has the same number of instances as other components that may use the same variable letter. Moreover, although even where the Figures contained herein may appear to depict a one-to-one correlation between certain components (e.g., the p ports and d devices of a given machine), those variables are not necessarily so limited in practice. For example, although each network work device will normally be connected to a port, every port does not necessarily have to have a network device connected to that port; rather, certain ports may be "empty," thus resulting in a different number of p ports than d devices (or any other component that can be connected to a port) in any given machine or other component.

FIG. 1B contains an enhanced view of portions of FIG. 1A, each machine 110 may consist of multiple network devices 114 (such as, e.g., network device 114-2(2) and PLC 112(2)), and a network routing element (such as, e.g., machine switch 111(2)). In one embodiment, the PLC can be used to control the network devices inside the same machine. Although not expressly depicted, a machine may contain other components, such as, e.g., a Human-Machine Interface (HMI). Machines may be any type of machine that can be used in an industrial control network, such as, e.g., a painting machine or welding machine in an industrial control network used to manufacture or assemble automobiles. Machines may be also be part of other types of industrial control networks, such as, e.g., industrial control networks used to make pharmaceuticals or manufacture various other products.

As shown in FIGS. 1A and 1B, each core (e.g., cores 140(1)-(n), entitled "Core 1" through "Core n") may contain one or more zones of cells (e.g., zone(s) 130(1)-130(z)), and each zone may contain one or more cells of machines (e.g., cell(s) 120(1)-120(c)). Each level of organization (e.g., each cell, zone, core, etc.) will typically include at least one network routing element, such as, e.g., cell switches 121 (e.g., entitled "Cell Switch 1" and "Cell Switch 2" in "Zone 1", and "Cell Switch 1" in "Zone z"), zone switches 131 (e.g., entitled "Zone Switch 1" and "Zone Switch z"), and core switches 141 (e.g., entitled "Core Switch 1"). As used herein, the terms "relay," "relayed" and "relaying" can include at least the concepts of switching, routing, forwarding, transmitting, sending packets, and other such operations, as well as those actions performed via such network routing elements, including, at least, broadcasting, unicasting, and multicasting.

Although each machine may contain exactly the same device configuration and topology information as every other machine, that is not necessarily required by the present disclosure. The topology of each machine, cell, zone, and so forth, however, is expected to be of a known configuration, or substantially so. That is, following the initial deployment of a machine, changes to the topology of that machine are expected to be made very rarely, if at all.

Industrial control networks generally also contain at least one server, compatible with the network protocols used by the given industrial control network. Although various network protocols can be used in conjunction with the methods and systems described herein, the embodiment depicted in FIGS. 1A and 1B use Dynamic Host Configuration Protocol ("DHCP"). Although any type of server appropriate to applications such as those described herein may be used in accordance with this disclosure, FIGS. 1A and 1B are depicted as employing a DHCP server (e.g., DHCP server 150) that is communicatively coupled to a Domain Name System ("DNS") server (e.g., DNS server 160). Such servers (e.g., DHCP server 150 and DNS server 160) are responsible for plant-wide address assignment and DNS resolution. A server, such as, e.g., DHCP server 150, assigns a unique network address to the devices (e.g., I/O devices) and PLCs on the network, and associates a unique DNS name with each of them. As will be explained in more detail below, the structure of the DNS names is hierarchical, and tied to the physical topology of the network and the location of each device.

Using the embodiment shown in FIGS. 1A and 1B as an example, the PLC inside a first machine (e.g., PLC 112(1) ("PLC") in machine 110-1(1) ("machine 1") in cell 120(1) ("cell 1")) needs to have a DNS name such as, e.g., "plc.mach1.cell1.zone1.ics"; while the name for the PLC inside a second machine (e.g., PLC 112(m) ("PLC") in machine 110(m) ("machine 2") in cell 120(c) ("cell 2")) needs to follow the same naming convention, so in this case, e.g., "plc.mach2.cell2.zone1.ics". The address assignment and naming convention used is preferably automatically scalable, meaning that when new network elements (devices, machines, cells, zones, cores, etc.) are added to an industrial control network, the new network elements can be configured/provisioned in the same manner without having to re-configure the network routing element(s) or server(s) involved (e.g., DHCP server 150 and/or DNS server 160). In addition, when a network device (such as, e.g., the I/O device entitled "I/O Device 2") is replaced, the replacement device receives the same DNS name and network address as the previous device.

Although one example set of naming conventions is provided in this disclosure, other naming conventions may be used. As one example, machines can be given more descriptive names than are used herein. In the case of an automobile manufacturing assembly line, for example, the industrial control network may include welding machines, painting machines, and riveting machines. Each of those machines are preferably assigned names that are descriptive of that machine's function, such as, e.g., "WeldMach2" or "Welder2" for the welding machines; "Paint1" or "Red-Paint1" for the painting machines; and "Rivet1" or "Door-Rivet1" for the riveting machines. Alternatively, in the case of a pharmaceutical manufacturing assembly line, for example, the industrial control network may include machines for filling a certain type of pill capsule, counting the number of pill capsules that should be placed in a given pill bottle, and then labeling that bottle. Each of those machines (and other machines used in conjunction with this disclosure) are preferably assigned names that are descriptive of that machine's function, such as, e.g., "Filler1" or "Ibuprofen_Filler3" for the filling machines; "Guaifenesin_Ctrl" or "Guaifenesin_60ct_1" for the pill counting machines; and "Label_3" or "Aspirin_Labeler_2" for the labeling machines. Similarly, other devices (such as, e.g., PLCs and HMIs), the various ports, and the various levels of organization (e.g., cells, zones, cores, etc.) may each use different naming conventions than those that are used in the examples in this disclosure.

Preferably, each network component should have a name that is descriptive of its location and/or function, as this enables a human (e.g., a technician) to immediately know what type of device failed, and where that device is located within the topology of the network (and, at least potentially, its physical location). To that end, although a number is not required to be part of a node's name, the inclusion of a number can prove helpful in certain situations. Preferably, the number corresponds to the physical port to which the node is connected to the next network routing element (e.g., a hub, router, switch, or similar device) that is "upstream" from that node, as this will enable a human technician to more quickly and efficiently locate a network device in need of replacement. These aspects of this disclosure have many benefits, including, among others, providing users with a systems that saves valuable time that would otherwise be wasted looking up the location of a device based on its network address. As will be appreciated in light of the present disclosure, this benefit is magnified even further when a network uses longer and more complex network addresses, such as those that are consistent with IPv6 conventions.

As mentioned above, FIG. 1B depicts a more detailed view of various aspects of FIG. 1A. In addition to the elements discussed above, FIG. 1B provides more details for certain of machines 110. As depicted in FIG. 1B, each machine 110 contains a PLC 112 connected to a network routing element (e.g., machine switch 111(1)). Each network routing element includes, or is connected to, numerous ports 113 (e.g., entitled "Port 1" through "Port p"). Although not required in practice, each of ports 113 depicted in FIG. 1B is shown with a device 114 connected thereto, such as "I/O device 2". Each machine's network routing element (e.g., machine switch 111(2)) is connected to a network routing element for the cell containing that machine (e.g., cell switch 121(1)). Each cell's network routing element is, in turn, connected to the network routing element for the zone containing that cell (e.g., zone switch 131(1)), which in turn is connected to the network routing element for the core containing that zone (e.g., core switch 141(1)). Each core's network routing element is connected to a DHCP server (e.g., DHCP server 150), which is in turn connected to a DNS server (e.g., DNS server 160).

Also depicted in FIGS. 1A and 1B is a discovery message, such as, e.g., discovery message 180. This discovery message may be any packet sent from a newly connected network device, to a server, seeking to determine at least its network address and host name in a manner consistent with this disclosure. The packet may be sent via various methods, including at least broadcasting, unicasting, and multicasting. In the embodiment primarily discussed herein, this discovery message is a DHCP discovery message. More particularly, in this example, discovery message 180 represents a packet containing a DHCPDISCOVER message at various stages along the path from the new network device (I/O Device 2 114-2(2)) to the DHCP server (e.g., DHCP server 150) via network 170.

As will be described in more detail below, the Host Name of the new network device can be dynamically determined as the discovery message packet passes from network routing element to network routing element. As this value is being determined, the current value of the Host Name is maintained in a designated field of the discovery message. In the embodiment depicted herein, that designated field is the DHCP "Host Name" option. As can be seen in discovery message 180(a), the designated "Host Name" field is not present when the packet is first sent from network device 114-2(2) to machine switch 111(2) (via Port 2 113-2(2)). However, when the packet arrives at machine switch 111(2), the "Host Name" field and a value (e.g., "io2") representing the name of the requesting device (e.g., "I/O Device 2") will be added to the packet, as shown in discovery message 180(b). Then, as the discovery message is transmitted via network 170 from network routing element to network routing element, the value of the designated field (e.g., the "Host Name" option) will be modified at each network routing element to include a value representing the name of the previous level of organization (e.g., "Machine 2", "Cell 1", "Zone 1", "Core 1", etc.) from which the packet was sent. (In certain embodiments, the top-most level of organization does not necessarily have to be represented in this naming convention, particularly where there is only one "topmost level." For example, in the example discussed herein, there is only one topmost level (e.g., the "core" level), so that level does not necessarily have to be represented in the final value of the designated field; alternatively, not only can more than one core (or other "topmost") level exist, but there can be any number of levels created and employed in such a hierarchy, and all such embodiments are intended to come within the scope of the present disclosure.) In one embodiment, this modification may include a network routing element re-writing, or otherwise re-generating, the discovery message (packet). Thus, discovery message 180(c) depicts the value of the designated "Host Name" field after passing through cell switch 121(1) as "io2.mach2", which represents the fact that the discovery message was forwarded to cell switch 121(1) from machine switch 111(2). Similarly, discovery message 180(d) depicts the value of the designated "Host Name" field after passing through zone switch 131(1) as "io2.mach2.cell1", which represents the fact that the discovery message was forwarded to zone switch 131(1) from cell switch 121(2). Continuing, discovery message 180(e) depicts the value of the designated "Host Name" field after passing through core switch 121(1) as "io2.mach2.cell1.zone1.ics", which represents the fact that the discovery message was forwarded to core switch 141(1) from zone switch 131(2), as well as a predetermined "extension" (e.g., ".ics"). This process will be described in more detail below.

FIG. 2 is a flowchart of a method 200 illustrating various actions performed in connection with one embodiment of the systems and techniques disclosed herein. As will also be appreciated in light of the present disclosure, this method may be modified in order to derive alternative embodiments. Moreover, although the operations in the embodiment illustrated are shown in a sequential order, certain operations can be performed or may occur in an order different from that shown, certain operations may be performed concurrently, certain operations may be combined with other operations, and certain operations may be omitted in another embodiment.

Method 200, which is described with reference to the example elements shown in FIGS. 1A and 1B, shows the workflow of the auto-provisioning when a new network device is connected to a machine, as understood from the perspective of the new network device. In one implementation, at least a portion of method 200 can be implemented by a network device, such as network devices 114(1)(1)-114(1)(d), 114(2)(1)-114(2)(d), through 114(m)(1)-(m)(d) (collectively, network devices 114) as shown in FIGS. 1A and 1B. In one embodiment, the network devices can be, e.g., I/O devices, PLC, HMIs, or any other type of network devices that are capable of being used, or being configured to be used, with methods and systems such as those described herein.

In 210, a new network device is connected at a port p on a machine m in industrial control network 100. This new network device may be any type of network device, including, but not limited to, the types of network devices described herein. Moreover, the new network device may be connected at any port on any machine within the industrial control network. The example discussed herein will focus on network device 114-2(2) connected to port 113-2(2), of machine 110(2), in cell 120(1). Although network device 114-2(2) is an I/O device ("I/O Device 2") in this example, in practice this and other of network devices 114 discussed herein may be any type of network device that provides the requisite functionality.

In the example depicted in FIGS. 1A, 1B and 2, upon being physically connected to a machine, the new network device automatically transmits a discovery message to a server (such as, e.g., network server 150) in 220. One purpose of a discovery message, in accordance with such embodiments, is to enable a new network device to determine its network address, as well as other information related to the network and its position in that network. In this particular example, network device 114-2(2) can transmit a discovery message 180 to DHCP server 150 via network 170. In one embodiment (using DHCP), discovery message 180(a) is a DHCP discovery message, such as a DHCPDISCOVER message. In the embodiment discussed presently, the network server is DHCP server 150, but in practice can be any appropriate server (i.e., one that can be configured to support functionality described herein). Other embodiments use networking protocols other than DHCP, and, thus, can implement discovery messages in a manner other than a DHCPDISCOVER message (including other DHCP formats and/or message types).

As will be discussed in more detail subsequently, embodiments such as those described herein route discovery message 180 through a network, such as network 170, until the discovery message arrives at a server (or other such device that is capable of performing the relevant functionality as described herein), such as DHCP server 150. That server (or other device) will process the message in the appropriate manner, and transmit an offer message (not depicted in FIG. 1 or 1A) to the new network device. An offer message sent in accordance with this embodiment preferably contains a host name consistent with the methods and systems described herein, as well as the network address that has been offered to the new network device, although out-of-band techniques can also be used to convey such information. In an embodiment using DHCP, the offer message is a DHCPOFFER message. Other embodiments can use a networking protocol other than DHCP, and can send offer messages according to a standardized or proprietary format other than a DHCPOFFER message (including other DHCP formats and/or message types). In an embodiment using DHCP and DHCPOFFER messages, the DHCPOFFER message should ideally include the host name is the "Host Name" field of the DHCPOFFER message. The offer message will also generally contain various other information in addition to the host name and network address being offered.

Once the offer message has been sent by the server (or other device), the new network device will determine if an offer message has been received in 230. As indicated above, the offer message should contain the network address and host name that have been offered to the new network device. If an offer message has not yet been received, then in 230 the new network device can be configured to continue to "wait" for an offer message, i.e., to repeat 230 as needed until an offer message does arrive (but can, and typically will at some point, indicate a timeout error if no such offer message is received). In the example discussed herein, network device 114-2(2) would receive a DHCPOFFER message (not depicted in the Figures) from DHCP server 150 via network 170. In other embodiments, a different one of network devices 114 may send such a discovery message, in which case the one of network devices 114 that sent the discovery message would also be the device that ultimately receives the offer message. Moreover, as mentioned above, the offer message may be in a format other than a DHCPOFFER message. Further still, in certain embodiments, a network device such as one of network devices 114 can be configured to act as a proxy for another network device of network devices 114. These and other such alternatives are intended to come within the scope of the present disclosure.

Upon receipt of the offer message in 230, the new network device can extract and save the network name (e.g., host name) and network address that were offered to the new network device via the offer message at 240. The network name (e.g., host name) and network address that were offered can be stored in any non-transitory computer-readable storage medium (as used herein, "storage"), such as, e.g., RAM, ROM, a BIOS, flash memory, a register or cache, a hard disk drive, and a solid state disk drive, among other alternatives. The information in such an offer enables a new network device to determine both the network address and the host name that have been offered to that new network device. As will be discussed in more detail elsewhere herein, determining its host name in accordance with such embodiments also enable a new network device to determine its position within the topology of the network. Determining its own host name will enable a new network device to communicate with other devices on the network.

In the example discussed herein, network device 114-2(2) ("I/O Device 2") is offered a host name of "io2.machine2.cell1.zone1.ics." As a reader may recognize, this is the same host name that was automatically determined as packet 180 passed through network 170, and which was ultimately passed to DHCP server 150 via packet 180(e). Based on this host name, network device 114-2(2) should be capable of determining its connection to port 113-2(2) ("Port 2") of machine 110(2) ("Machine 2") in cell 120(1) ("Cell 1") of zone 130(1) ("Zone 1"). Although not so limited, if the offer message is a DHCPOFFER message, the host name may be included in the Host Name field/option of that message, or may be included in other fields/options of such a message. In other embodiments, the host name may be provided in a different manner, whether via a DHCPOFFER message or a differently formatted message.

After receiving an offer message, a new network device can use information in the offer message received in 240 to set its network name (e.g., DNS host name) in 250. In the example used in this disclosure, network device 114-2(2) can use information from the received DHCPOFFER message to set its host name to the value of the designated field, in this example, "io2.mach2.cell1.zone1.ics". Once the new network device determines its host name, the new network device can then use its host name to determine its location within the topology of network 100. In this example, network device 114-2(2) ("I/O Device 2") could determine its connection to port 113-2(2) ("Port 2"), based on the "lowest level" or "device" portion (i.e., "io2" in this example) of the host name. Along those same lines, network device 114-2(2) ("I/O Device 2") could determine its connection to machine 110(2) ("Machine 2") based on the "mach2" portion of the host name. Further, network device 114-2(2) ("I/O Device 2") could determine that both itself and machine 110(2) ("Machine 2") are part of cell 120(1) ("Cell 1") based on the "cell1" portion of the host name, which in turn is part of zone 130(1) ("Zone 1") based on the "zone1" portion of the host name. In practice, other name conventions can be used, as can other network topologies. Networks may have more or less levels of organization (e.g., cells, zones, etc.). Any naming convention can be used in a manner consistent with this disclosure, but the naming convention that is used is preferably descriptive, so as to be easily and intuitively understandable to a human user with a basic understanding of the network at issue, such as a human technician.

Although not expressly depicted in 250, a new network device can also determine the network address that has been "offered" to that new network device by the server. Although the network addresses used throughout this disclosure are generally network addresses that are consistent with IPv4, in practice this disclosure will work with any form of network address, including, for example, IPv6, Media Access Control (MAC), and Asynchronous Transfer Mode (ATM) addressing schemes, under each respective addressing scheme's corresponding protocol. Upon determining the network address that was "offered" by the server, that new network device may send a "request" message in 260. A request message may serve the purpose of formally "requesting" the server to assign the network address and host name that were "offered" to the new network device. Thus, in certain embodiments, the request message sent in 260 includes the Host Name (or DNS name) and network address that are being requested by the new network device. In accordance with this disclosure, the Host Name (or DNS name) being requested in 260 should be the same as the value of the designated field (e.g., the "Host Name") that was offered to the new network device via the offer message (e.g., a DHCPOFFER message) received in 230. Similarly, the network address being requested in 260 should be the same network address that was offered to the new network device via the offer message received in 230. This Host Name (or DNS name) and network address may be requested by setting predetermined fields in the request message sent in 260. In one embodiment, the request message is a DHCPREQUEST message. Other embodiments may use a networking protocol other than DHCP, and, that being the case, can send request messages according to a standardized or proprietary format other than a DHCPREQUEST message (including other DHCP formats and/or message types). Additionally, as will be discussed in more detail in conjunction with FIG. 5, a new network device may use its network name (e.g., host name) as its DNS name in future communications, as shown in 270.

Certain modifications or configurations may be desirable for a network device to perform the operations of method 200. For instance, a network device (such as, e.g., network device 114-2(2)) may have to be configured to expect to receive a full DNS name in the designated field (e.g., "Host Name") of an offer message (e.g., a DHCPOFFER message) sent from a server (e.g., DHCP server 150). Additionally, as discussed above, a network device (such as, e.g., network device 114-2(2)) should be configured to remember the offered DNS name (as, for example, is needed in 240). This may be accomplished by, e.g., the network devices being configured to store the offered DNS name in a non-transitory, computer-readable storage medium, such as in a hard disk drive or solid state drive. Moreover, as will be discussed in more detail in connection with FIG. 5, each network device should be configured to recognize the hierarchical structure/network topography represented by the offered DNS name. Additionally, as will also be discussed in more detail in connection with FIG. 5, each network device is configured to derive the DNS name of other network devices in the same machine, based, at least in part, upon its own DNS name, in embodiments employing said networking protocols.

FIG. 3 is a flowchart of a method 300 illustrating various actions performed in connection with one embodiment of the systems and techniques disclosed herein. As will also be appreciated in light of the present disclosure, this method may be modified in order to derive alternative embodiments. Moreover, although the operations in the embodiment illustrated are shown in a sequential order, certain operations can be performed or may occur in an order different from that shown, certain operations may be performed concurrently, certain operations may be combined with other operations, and certain operations may be omitted in another embodiment.

Method 300, which is described with reference to the example elements shown in FIGS. 1A and 1B, shows the workflow of the auto-provisioning performed when a new network device is connected to a machine, as understood from a network routing element's perspective. In one implementation, at least a portion of method 300 is implemented by a network routing element, such as machine switches 111(1)-111(m) (collectively, machine switches 111), cell switches 121(1) and 121(2) (collectively, cell switches 121), zone switch 131(1), and core switch 141(1). As used herein, machine switches 111, cell switches 121, zone switch 131 (1), core switch 141(1) may collectively be referred to as "network switches." Although specific examples are used herein, a network switch may be any network routing element, regardless of its name or location in the network.

In element 310, a network routing element (e.g., a hub, router, switch, or similar device) receives a discovery message, such as discovery message 180. Using the example depicted in FIGS. 1A and 1B, machine switch 111(2) receives discovery message 180(*a*) from network device 114-2(2), cell switch 121(1) receives discovery message 180(*b*) from machine switch 111(2), zone switch 131(1) receives discovery message 180(*c*) from cell switch 121(1), and core switch 141(1) receives discovery message 180(*d*) from zone switch 131(1). In other embodiments, a discovery message may be received by other network routing elements, and may be received from other network routing elements or from other network devices.

In element 320, a network routing element that receives a discovery message determines whether that discovery message was received directly from (i.e., without having passed through any previous network routing elements) a network device, or whether that discovery message was received from another network routing element. One way to determine whether the discovery message was received directly from a network device is to check for the presence of the designated field in the discovery message. For instance, if the message is a DHCPDISCOVER message, the network routing element can check for the presence of a designated field in the message, such as a "Host Name" option. Another alternative is to determine whether a designated field has a substantive (e.g., non-null, non-empty, and non-default) value. If the designated field is not present, or if the designated field is present but does not have a substantive value, the network routing element can be configured to recognize that the discovery message arrived directly from the new network device. The network routing element can also be configured to recognize that if the designated field is present and has a substantive value, the discovery message was received from another network routing element. In such an embodiment, the presence of the designated field having a substantive value can be used to conclude that the discovery message has already passed through at least one network routing element, which would have added the designated field and substantive value to the discovery message. In other embodiments, a network routing element may make such determinations based on different criteria.

Using the examples depicted in FIGS. 1A and 1B, discovery message 180(*a*) (only expressly shown in FIG. 1B, but inherently present in FIG. 1A) is shown arriving at machine switch 111(2) directly from network device 114-2 (2). Because the designated field (in this example, "Host Name") is not present in discovery message 180(*a*), machine switch 111(2) should be configured to determine that discovery message 180(*a*) arrived directly from a network device (in this example, network device 114-2(2)). Continuing with this same example, however, when discovery message 180(*b*) arrives at cell switch 121(1), cell switch 121(1) should be configured to determine that discovery message 180(*b*) did not arrive directly from a network device, because the designated field (e.g., "Host Name") is already present and has a substantive value (e.g., "io2"). Similarly, zone switch 131(1) should be configured to determine that discovery message 180(*c*) did not arrive directly from a network device because the designated field also has a substantive value in discovery message 180(*c*). Likewise, core switch 141(1) should be configured to determine that discovery message 180(*d*) did not arrive directly from a network device because the designated field also has a substantive value in discovery message 180(*d*).

If a network routing element determines in 320 that the discovery message was received directly from a network device, then the network routing element proceeds to 330. In 330, the network routing element adds the designated field to the discovery message. In one embodiment, the designated field is added to the header of the discovery message. In an embodiment using DHCP, the designated field is the DHCP "Host Option," which can be added to the DHCP header of the discovery message. In such an embodiment, adding the designated field to the discovery message involves re-writing the discovery message. Continuing with the example discussed above, machine 111(2), having determined in 320 that discovery message 180(*a*) was received directly from network device 114-2(2), proceeds to 330. In 330, machine 111(2) adds the designated field (e.g., "Host Name") to discovery message 180.

After having determined that the discovery message was received directly from a network device in 320, a network routing element detects the network topology in 340 and sets the value of the designated field to contain the name representing that network device in 345. In one embodiment, setting the value of the designated field to a new value involves re-generating the discovery message. In one embodiment, each network routing element detects the discovery message's source based on the physical port at which the given packet arrived. For example, a machine's network routing element can detect that an incoming request came from the second physical port of the machine, and thus set the value of the designated field (e.g., "Host Name") to "io2", representing the device connected to the machine's second physical port. Although numbers are used as part of the example naming convention provided herein for ease of understanding, in practice such numbers are not required. In other embodiments, a machine's network routing element may be configured to determine that the device connected to a certain port is a certain type of device. For example, a machine's network routing element for a welding machine may be configured to determine that the device connected to its second port is a voltage sensor. In that embodiment, the machine's network routing element could set the designated field to a value that more descriptively represents the device attached at that port, such as, e.g., "volt_sensor".

Still using the above example, after adding the designated field (e.g., "Host Name") in 330, machine 111(2) then sets the value of the designated field to the name of the network device that sent the message, e.g., "io2", in 335. As indicated above, this value is determined, at least in part, based upon the physical port upon which the discovery message arrived at a machine's network routing element, in this case, port 113-2(2). This value is indicated in discovery message 180(*b*), as shown in FIGS. 1A and 1B. That is, discovery message 180(*b*) contains a "Host Name" value of "io2" (i.e., "HN='io2'"). In this embodiment, the naming convention used to represent the network device connected to port 2 of a machine is "io2". In other embodiments, other naming conventions may be used, so long as they are recognized and understood by any necessary system components (such as, e.g., network devices, network routing elements, machines, cells, zones, cores, servers, and the like). In certain embodiments, the designated field contains other information, in addition to the device name.

Conversely, if a network routing element determines in 320 that a discovery message was not received directly from a network device, then the process proceeds to 350 with respect to that network routing element. In one embodiment, such a determination is made as a result of the designated field (e.g., "Host Name") being present, and/or the designated field's having a substantive value of "io2".

In element 350, a network routing element detects the network topology and sets the value of the designated field the name representing the immediately-previous network routing element (i.e., the network routing element that relayed the discovery message to the current network routing element), and then "adds" (appends, prepends, inserts, concatenates, and/or performs similar functions) the name of that immediately-previous network routing element to the current value of the designated field. In one embodiment, setting the value of the designated field to a new value may involve re-writing the discovery message. In one embodiment, each network routing element can detect the source of the discovery message based on the physical port at which the packet arrived. For example, a cell's network routing element can detect that an incoming request came from that cell's network routing element's second physical port, and thus set the value of the designated field (e.g., "Host Name") to "mach2", representing the machine connected to the network routing element's second physical port. Although numbers are used as part of the example naming convention provided herein, in practice such numbers are not required. In other embodiments, a cell's network routing element may be configured to determine that the machine connected to a certain port is a certain type of machine. For example, a cell's network routing element in an automobile assembly line control network may be configured to determine that the machine connected to its second port is a welding machine. In that embodiment, the cell's network routing element could set the designated field to a value that more descriptively represents the machine attached at that port, such as, e.g., "welding_mach" or "welder".

Continuing with the above example, a network routing element such as cell switch 121(1) determines, in 320, that discovery message 180(*b*) was not received directly from a network device. In this example, such a determination is made as a result of the designated field (i.e., "Host Name" in this example) being present with a substantive value therein (i.e., "io2"). Having made such a determination, cell switch 121(1) adds the name of the immediately-previous network routing element to the value designated field. Thus, cell switch 121(1) adds "mach2" to the designated field, resulting in the value of the Host Name being set to "io2.mach2".

After setting the value of the designated field appropriately, the current network routing element may be configured to determine in 360 whether the current network device is the last network routing element prior to a server. If the current network routing element is not the last network routing element prior to a server, then the current network routing element relays the packet 370 to the next network routing element in the network path. Continuing with the above example, cell switch 121(1) would determine that there is at least one more network routing element prior to a server, and therefore relays discovery message 180(*c*) to zone switch 131(1). Zone switch 131(1) then iterates through operations 310 through 360. Following logic similar to the above, zone switch 131(1) is configured to determine 320 that discovery message 180(*c*) was not received directly from a network device. Proceeding to 350, zone switch 131(1) is configured to add the name of the immediately-preceding network routing element to the designated field. In the embodiment depicted in FIGS. 1A and 1B, this iteration of 350 can result in zone switch 131(1) setting the value of the "Host Name" to "io2.mach2.cell1". Upon determining in 360 that there is at least one more network routing element prior to a server, zone switch 131(1) is configured to relay 370 discovery message 180(*d*) to the next network routing element (e.g., core switch 141(1)).

Continuing with this example embodiment, core switch 141(1) may receive discovery message 180(*d*) in 310, and then iterates through operations 310 through 360. Following logic similar to the above, core switch 141(1) is configured to determine 320 that discovery message 180(*d*) was not received directly from a network device. Proceeding to 350, core switch 141(1) is configured to add the name of the immediately-preceding network routing element to the designated field. In the embodiment depicted in FIGS. 1A and 1B, this iteration of 350 can result in core switch 141(1) setting the value of the "Host Name" to "io2.mach2.cell1.zone1". Unlike the previous network routing elements, however, core switch 141(1) is configured to determine in 360 that there are not any more network routing elements prior to a server.

In 380, the "last network routing element" (i.e., the network routing element immediately before a server, in this case the network routing element immediately before DHCP server 150) may optionally add a predetermined file extension ("extension") to the designated value. The extension may be used to indicate, e.g., the naming convention being used, the type of network that is being used, or for any other desired purpose. Although the file extension ".ics" is used in the embodiments discussed herein, in practice any extension may be used, with the system elements in question configured to recognize and process the extension used. Alternatively, although less optimally, a system may simply ignore an extension that the system does not recognize and/or understand. Continuing with the above example, when core switch 141(1) determines that no further network routing elements remain prior to encountering a server (in 360), the process proceed to 380 with respect to core switch 141(1). In 380, core switch 141(1) adds an appropriate extension to the designated field. In the embodiment depicted in FIGS. 1A and 1B, core switch 141(1) therefore adds the ".ics" extension to the Host Name option, resulting in a final Host Name value of "io2.mach2.cell1.zone1.ics", as shown in discovery message 180(e).

After determining that the current network routing element is the last network routing element (in 360), and after optionally adding the appropriate extension to the designated value in 380, the last network routing element relays the discovery message to the server. In the above example, core switch 141(1) thus relays discovery message 180(e), having a Host Name value of "io2.mach2.cell1.zone1.ics", to DHCP server 150, per 360. Method 300 then concludes at this point, with control passing to DHCP server 150 to perform a method such as method 400, discussed in more detail below.

In the embodiment depicted as method 300, a "dot" (i.e., ".") is used to separate the names of each of the network routing elements and network devices. In other embodiments, a different character or delimiter may be used to separate the names of each of the network routing elements and network devices. Although using a delimiter such as a dot is preferred, in practice the use of such a delimiter is not required to perform the functionality disclosed herein. Similarly, in such an embodiment, each piece of newly-added information is appended to the end of the current value of the designated field. In other embodiments, this order can be reversed, such that the newly-added value is prepended to the beginning of the previous value of the designated field. In still other embodiments, a different order may be used, so long as the overall naming convention can be processed appropriately by the system, and preferably, is easily understandable for a human user. Along those same lines, the specific naming conventions used to identify each network device and network routing element may differ in different embodiments. While the precise naming convention is not critical to the functionality of this disclosure, use of a naming convention that is easily understandable by a human user (such as, e.g., a technician) is preferable to other alternatives.

In one embodiment, method 300 does not make any changes to a discovery message other than the changes (e.g., updating the value of the designated field) described in this disclosure. In one embodiment, method 300 changes certain fields in a discovery message, but protects other fields (e.g., the "giaddr" field in a DHCPDISCOVERY message) from any changes.

Certain modifications or configurations may be necessary for network routing elements to perform the operations of method 300. For instance, a network routing element (such as, e.g., cell switch 121(1)) can be configured to determine, upon receive of a discovery or request message (such as, e.g., DHCPDISCOVER message 180 or a DHCPREQUEST message), whether the packet was sent from a directly-connected device, or from a network routing element. Additionally, if the packet was sent by an endpoint device, the network routing elements can be configured to detect the physical position of the device in the topology (by using, e.g., the Link Layer Discovery Protocol (LLDP)), and to add the designated field (e.g., the "Host Name" option) to the discovery message (e.g., DHCPDISCOVERY message 180). Further, such network routing elements can be configured to relay the discovery message (e.g., DHCPDISCOVER message 180) through the data plane, after performing operations such as those described herein. Moreover, the network routing elements should not transform offer messages (e.g., a DHCPOFFER message) or "ACK" messages that are sent from a server (such as, e.g., DHCP server 150) to a newly-connected network device (e.g., network device 114-2(2)).

Figure 4:
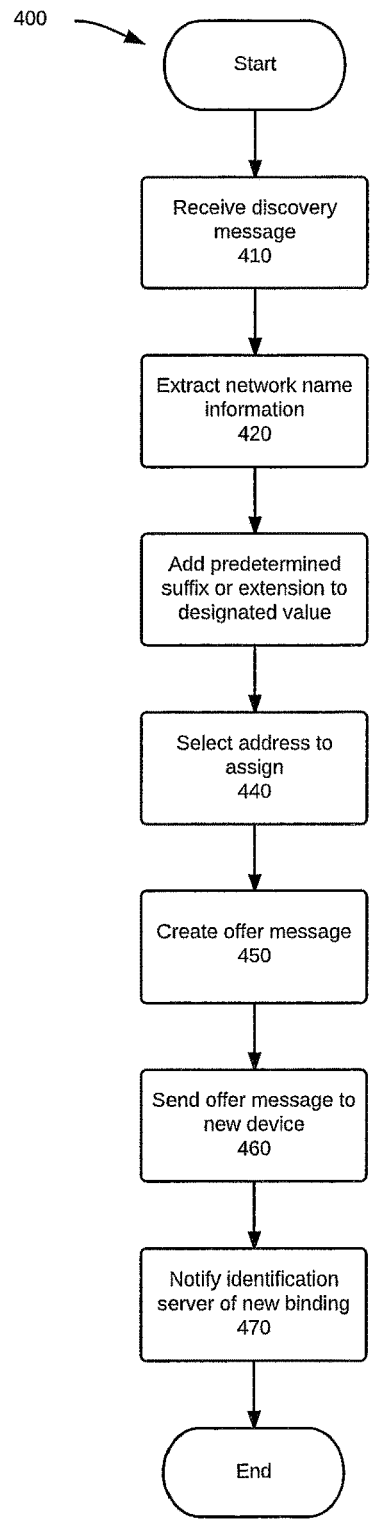
FIG. 4 is a flowchart that illustrates actions that can be performed by a server in order to offer a network address and host name to a newly added network device, according to one embodiment.

FIG. 4 is a flowchart of a method 400 illustrating various actions performed in connection with one embodiment of the systems and techniques disclosed herein. As will also be appreciated in light of the present disclosure, this method may be modified in order to derive alternative embodiments. Moreover, although the operations in the embodiment illustrated are shown in a sequential order, certain operations can be performed or may occur in an order different from that shown, certain operations may be performed concurrently, certain operations may be combined with other operations, and certain operations may be omitted in another embodiment.

Method 400, which is described with reference to the example elements shown in FIGS. 1A and 1B, shows the workflow of the auto-provisioning when a new network device is connected to a machine, as understood from a server's perspective. In one implementation, at least a portion of method 400 can be implemented by a server, such as, e.g., DHCP server 150 and DNS server 160. Although specific examples are used herein, a server such as that described herein may be any appropriate server, regardless of its specific position in the network topology, protocol supported (e.g., DHCP, DNS, HTTP, media server, etc.), and/or other functionality thus provided. Additionally, although method 400 is described herein from the perspective of a server, such a server is not necessarily required in order to effect any of the operations of method 400.

In 410, a server receives a discovery message. As was described above, the application of method 300 by one or more servers will have resulted in storing a descriptive network name (e.g., host name) value in the designated field. A server can then extract that network name (e.g., host name) value from the designated field of the discovery message in 420, and store that network name (e.g., host name), at least temporarily, in a non-transitory, computer-readable storage medium, such as RAM, flash memory, or a hard disk drive, among other storage options, for example. Continuing, DHCP server 150 receives discovery message 180(e) at 410. In 420, DHCP server 150 then extracts a network name (e.g., host name), such as the "HN" value of "io2.mach2.cell1.zone1.ics", as shown in 180(e). To complete 420, DHCP server 150 may then optionally store the given network name (e.g., host name) in a non-transitory, computer-readable storage medium, such as those described herein.

In response to receiving the discovery message in 410, a server also selects an Internet Protocol (IP) address to assign to the network device that originated the discovery message in 220. In one embodiment, the network address may be a 32-bit IP address, such as is used, e.g., in IPv4. Alternatively, the network address may be a 128-bit IP address, such as is used, e.g., in IPv6. Other embodiments may use other protocols, and so implement addressing schemes such as, e.g., MAC and ATM addressing. In the example embodiment provided herein, DHCP server 150 may assign an IP address (such as, e.g., 192.168.1.17) to network device 114-2(2), which is the network device that initiated the discovery message via discovery message 180(a) in element 220.

In 440, a server uses the network name (e.g., host name) extracted in 420 and the network address assigned in 430 to create an offer message. This offer message (not expressly depicted in the Figures) will be sent to the network device that had originated the discovery message in 220. In addition to other potential information and functionality, this offer message can be used to inform the network device about its host name created via method 300 and the network address that is being offered to that network device, per 430. The host name is of special importance, as the value of that host name can then be used by the network device in method 500 (discussed in more detail below) to determine its location within the network topology, and to perform subsequent communications with other network devices, network routing elements, servers, and other potential network components.

Similar to 380, in 440 a server may be configured to add a predetermined extension (e.g., a prefix, suffix, or other affix) to the designated value. Preferably, although not expressly shown in FIG. 4 (and not mandatory), a server would perform this operation only if the immediately-preceding network routing element (e.g., hub, router, switch, or similar device) was not configured to (or did not) perform 380. In other words, while adding the predetermined extension at some point during the automated process of determining the host name of a new network device may be desirable, this extension is only added to each host name once, preferably. As indicated above, the extension may be used to indicate, e.g., the naming convention being used, the type of network that is being used, or for any other desired purpose. Although the file extension ".ics" is used in the embodiments discussed herein, in practice any extension may be used, given the systems involved are configured to recognize and understand that extension.

In 440, DHCP server 150 adds the predetermined extension to the designated field. Although not expressly shown in FIG. 4, using the example depicted in FIGS. 1A and 1B, DHCP server 150 therefore adds the ".ics" extension to the Host Name option, resulting in a final Host Name value of "io2.mach2.cell1.zone1.ics", as shown in discovery message 180(e).

Continuing, DHCP server 150 uses the network name (e.g., host name) extracted in 420 and the network address assigned in 430 to create an offer message. In one embodiment, the offer message is a DHCPOFFER message. Following the example embodiment discussed herein, a DHCPOFFER message created by DHCP server 150 in 440 contains a value representing the host name "io2.mach2.cell1.zone1.ics" and an IP address such as, e.g., 192.168.1.17. An offer message may contain other information in addition to the host name and network address being offered to a network device, may use a different protocol than DHCP, and may be of a different format than a DHCPOFFER message, although such an offer message will include the host name that was offered to the server that originated the discovery message in 220.

After creating the offer message in 440, a server sends the offer message to the new network device in 450. In this example, DHCP server 150 performs the operation(s) depicted as 450 by sending an offer message (such as, e.g., a DHCPOFFER message) to network device 114-2(2). In one embodiment, this offer message is sent via network 170. In other embodiments, a different network or medium of communication can be used to effect 450.

In 460, a server also notifies a DNS server of the host name and network address that were offered to the new network device in 450, and may also provide information about the new network device itself (e.g., the type of network device, processing resources available, and/or other such information). This process results in what is referred to as a "binding," enabling the DNS server to associate ("bind") the new network device to the network address (and, potentially, other relevant information) thus assigned. A DNS server can use this information to create a corresponding DNS record. Such a DNS record can include, for example and among other information, the host name and network address that were offered to the new network device in 450. In this example, DHCP server 150 notifies DNS server 160 of the binding containing the relevant information in 460.

Although not expressly depicted in FIG. 4, a server can also receive a request message from the new network device. Such a request message may be sent by the new network device in response to receiving the offer message sent in 450. Such a request message can be used to formally request (or, e.g., to confirm the acceptance of) the host name and network address offered to the new network device via the offer message sent in 450. Continuing, network device 114-2(2) sends such a request message (e.g., a DHCPREQUEST message) to DHCP server 150 in response to receiving an offer message (e.g., a DHCPOFFER message) that was sent in 450. In one embodiment using DHCP, the request message may be a DHCPREQUEST message.

Certain modifications or configurations may be necessary for a server to perform the operations of method 400. For instance, a server (such as, e.g., DHCP server 150) may need to be configured to require incoming discovery messages (such as, e.g., DHCPDISCOVER messages) and request messages (such as, e.g., DHCPREQUEST messages) to each contain a designated field (e.g., a DHCP "Host Name" option). Additionally, as discussed above, a server (such as, e.g., DHCP server 150) can be configured to append a pre-configured extension (e.g., ".ics") at the end of the designated field, per 430. Moreover, a server (such as, e.g., DHCP server 150) may be configured to return the full DNS name in a designated field (e.g., a DHCP "host name" option) to the client. Further, in a network with multiple servers, one server (e.g., a network server such as, e.g., DHCP server 150) may be configured to update another server (e.g., a DNS server such as, e.g., DNS server 160) to create a new record for the new network device.

Figure 5:
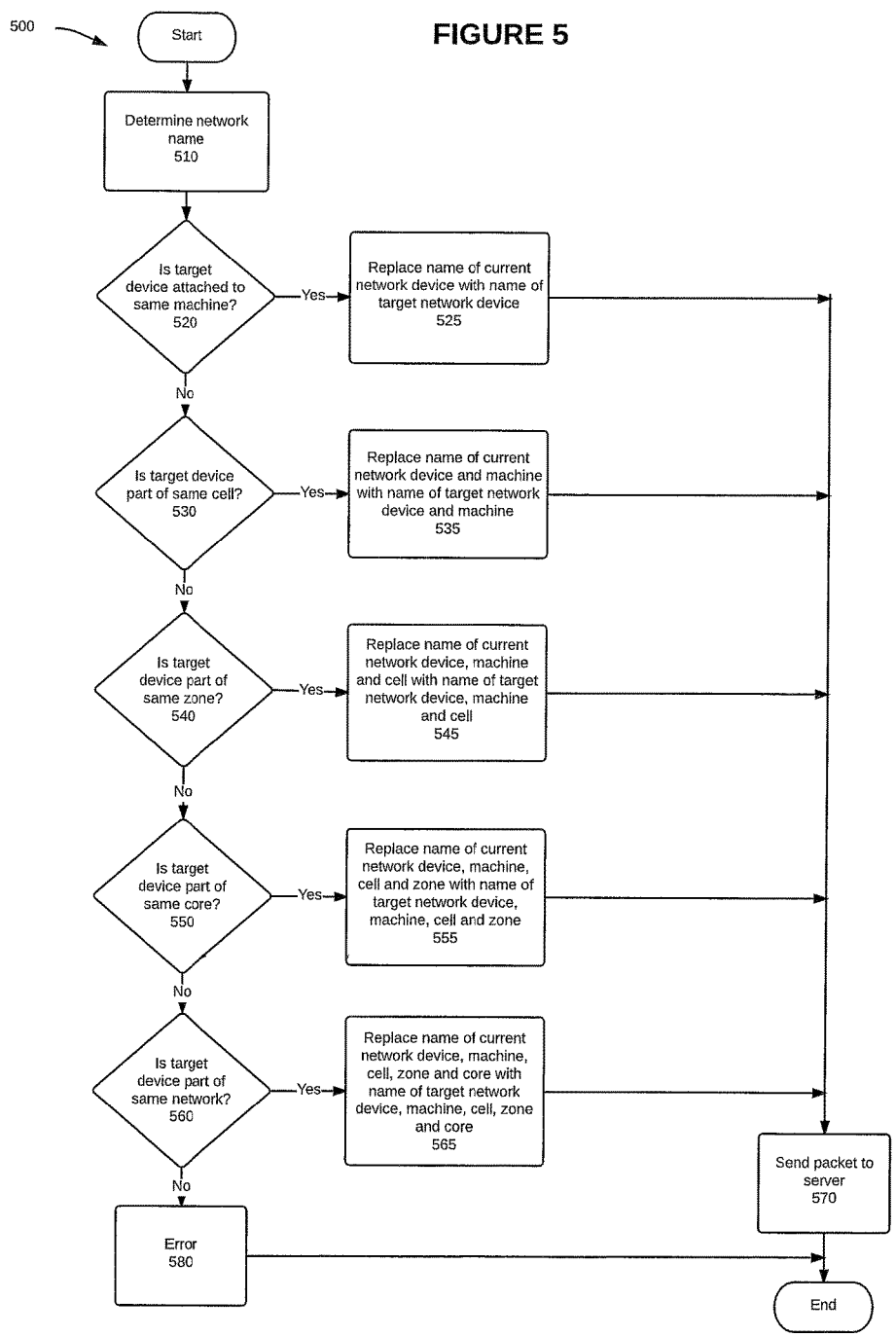
FIG. 5 is a flowchart that illustrates actions that can be performed by a network device in order to communicate with other network nodes using its automatically-determined host name, according to one embodiment.

FIG. 5 is a flowchart of a method 500 illustrating various actions performed in connection with one embodiment of the systems and techniques disclosed herein. As will also be appreciated in light of the present disclosure, this method may be modified in order to derive alternative embodiments. Moreover, although the operations in the embodiment illustrated are shown in a sequential order, certain operations can be performed or may occur in an order different from that shown, certain operations may be performed concurrently, certain operations may be combined with other operations, and certain operations may be omitted in another embodiment.

Method 500, which is described with reference to the example elements shown in FIGS. 1A and 1B, shows the workflow of a network device using its host name to communicate with other network nodes, as understood from a network device's perspective. In one implementation, at least a portion of method 500 can be implemented by a network device, such as network device 114-2(2). Although a specific example is used herein, a network device may be any network device, such as any of network devices 114.

As was discussed with respect to FIG. 2, upon receiving an offer message in 230, a network device extracts its host name and network address from that offer message, and store that information in a non-transitory computer-readable storage medium in 240. As discussed in connection with FIG. 2, this network name (e.g., DNS host name) can be used when sending the request message in 260, as well as for ACK exchanges. As explained in more detail below, this network name (e.g., DNS host name) can also be used in future communications 270. Based on an understanding of the naming convention of its host name, the network devices (e.g., PLCs and I/O devices) can determine where they are in the physical topology of the industrial control network. A network device can then utilize that information when that network device needs (or wants) to communicate with other nodes, as per method 500.

In element 510, a network device determines networking information, such as its network name (e.g., host name) and/or network address. A network device may determine this networking information by, e.g., querying a non-transitory, computer-readable storage medium, such as the non-transitory computer-readable storage medium in which that information was stored in 240. For instance, if network device 114-2(2) ("I/O Device 2") needs to communicate with another node, network device 114-2(2) can determine its host name (e.g., "io2.mach2.cell1.zone1.ics") from a non-transitory, computer-readable storage medium in which that information was stored, such as in 240.

This host name can then be modified to reflect the host name of the node that is the intended target of the communication. This modification can be based on relative location of the target node in relation to the sending device. In 520, the sending network device can determine if the target device is attached to the same machine as the sending device. If the target device is attached to the same machine, then the target device can modify the host name by replacing its own name with the name of the target network device, per 525. For instance, if network device 114-2(2) ("I/O Device 2") needs to communicate with the PLC 112(2) in the same machine (e.g., machine 110(2) ("Machine 2")), network device 114-2(2) would replace its name (e.g., "io2") with the name of the PLC (e.g., "plc"). As a result, network device 114-2(2) could determine that the host name of the target PLC is "plc.mach2.cell1.zone1.ics". Upon so modifying its own host name in 525, the sending network device can use that information to send the outbound communication (e.g., packet) in 570 by sending a packet with the modified host name to a server, such as, e.g., the network's DNS server (e.g., DNS server 160).

If the sending network device determines in 520 that the target device is not attached to the same machine, the sending network device can then determine if the target device is part of the same cell as the sending device in 530. If the target device is part of the same cell, then the target device can modify the host name by replacing its own name and the name of its machine with the name of the target network device and the name of the target machine, per 535. For instance, if network device 114-2(2) needs to communicate with the PLC 112(1) in machine 110(1), network device 114-2(2) would replace the relevant portions of its hostname (e.g., "io2.mach2") with the name of the target device and target machine (e.g., "plc.mach1"). As a result, network device 114-2(2) could determine that the host name of the target PLC is "plc.mach1.cell1.zone1.ics". Upon so modifying its own host name in 535, the sending network device can use that information to send the outbound communication (e.g., packet) in 570 by sending a packet with the modified host name to a server, such as, e.g., the network's DNS server (e.g., DNS server 160).

If the sending network device determines in 530 that the target device is not part of the same cell, the sending network device can then determine if the target device is part of the same zone as the sending device in 540. If the target device is part of the same zone, then the target device can modify the host name by replacing its own name, its machine's name, and its cell's name, with the name of the target network device in accordance with the target network device's own topology, per 545. For instance, if network device 114-2(2) ("I/O Device 2") needs to communicate with PLC 112(3) ("PLC") in machine 110(1) ("Machine 1") of cell 120(c) ("Cell 2"), network device 114-2(2) would replace the relevant portions of its hostname (e.g., "io2.mach2.cell1") with the name of the target device and target machine (e.g., "plc.mach1.cell2"). As a result, network device 114-2(2) could determine that the host name of the target PLC is "plc.mach1.cell2.zone1.ics". Upon so modifying its own host name in 545, the sending network device can use that information to send the outbound communication (e.g., packet) in 570 by sending a packet with the modified host name to a server, such as, e.g., the network's DNS server (e.g., DNS server 160).

If the sending network device determines in 540 that the target device is not part of the same zone, the sending network device can then determine if the target device is part of the same core as the sending device in 550. If the target device is part of the same core, then the target device can modify the host name by replacing the target device's own name, the target device's machine's name, the target device's cell's name and target device's zone's name, with the name of the target network device in accordance with the target network device's own topology, per 555. For instance, if "I/O Device 2" needs to communicate with the PLC in a "Machine 3" of "Cell 3" in "Zone 2" (not expressly depicted in the figures contained here), "I/O Device 2" would replace the relevant portions of its hostname (e.g., "io2.mach2.cell1.zone1") with the name of the target device and target machine (e.g., "plc.mach3.cell3.zone2"). As a result, "I/O Device 2" could determine that the host name of the target PLC is "plc.mach3.cell3.zone2.ics". Upon so modifying its own host name in 555, the sending network device can use that information to send the outbound communication (e.g., packet) in 570 by sending a packet with the modified host name to a server, such as, e.g., the network's DNS server (e.g., DNS server 160).

If the sending network device determines in 550 that the target device is not part of the same core, the sending network device can then determine if the target device is part of the same network (or whatever else is the highest organizational unit of the system) as the sending device in 560. If the target device is part of the same network, then the target device can modify the host name by replacing its own name, its machine's name, its cell's name, its zone's name, and its core's name, with the name of the target network device in accordance with the target network device's own topology, per 565. For instance, if network device 114-2(2)

("I/O Device 2") needs to communicate with the "PLC" in a "Machine 3" of "Cell 3" in "Zone 2" in "Core 2" (not expressly depicted in the figures contained here), network device 114-2(2) ("I/O Device 2") would replace the relevant portions of its hostname (e.g., "io2.mach2.cell1.zone1.core2") with the name of the target device and target machine (e.g., "plc.mach3.cell3.zone2.core2"). As a result, network device 114-2(2) could determine that the host name of the target PLC is "plc.mach3.cell3.zone2.core2.ics". Upon so modifying its own host name in 565, the sending network device can use that information to send the outbound communication (e.g., packet) in 570 by sending a packet with the modified host name to a server, such as, e.g., the network's DNS server (e.g., DNS server 160).

If the sending network device determines in 560 that the target device is not part of any organizational level, or is unable to make such a determination, the sending network device may then determine that an error has occurred in 580. Method 500 would then end.

Although FIG. 5 provides one example embodiment of a communication in view of this disclosure, method 500 is not limited to the examples provided herein. Rather, method 500 can be scaled and modified to perform in accordance with other systems of organization, and other naming conventions, as will be appreciated in light of the present disclosure.

In addition to the configurations options that may be necessary to perform method 200, which were discussed above, certain modifications or configurations may be necessary for a network device to perform the operations of method 500. For instance, each network device is preferably configured to recognize the hierarchical structure/network topography represented by the offered DNS name. Additionally, when communicating with another device on the same network, a network device can derive a target network device's DNS name from the network device's own DNS name, and the network device can query the DNS server for the corresponding IP address associated with the target network device.

Figure 6:
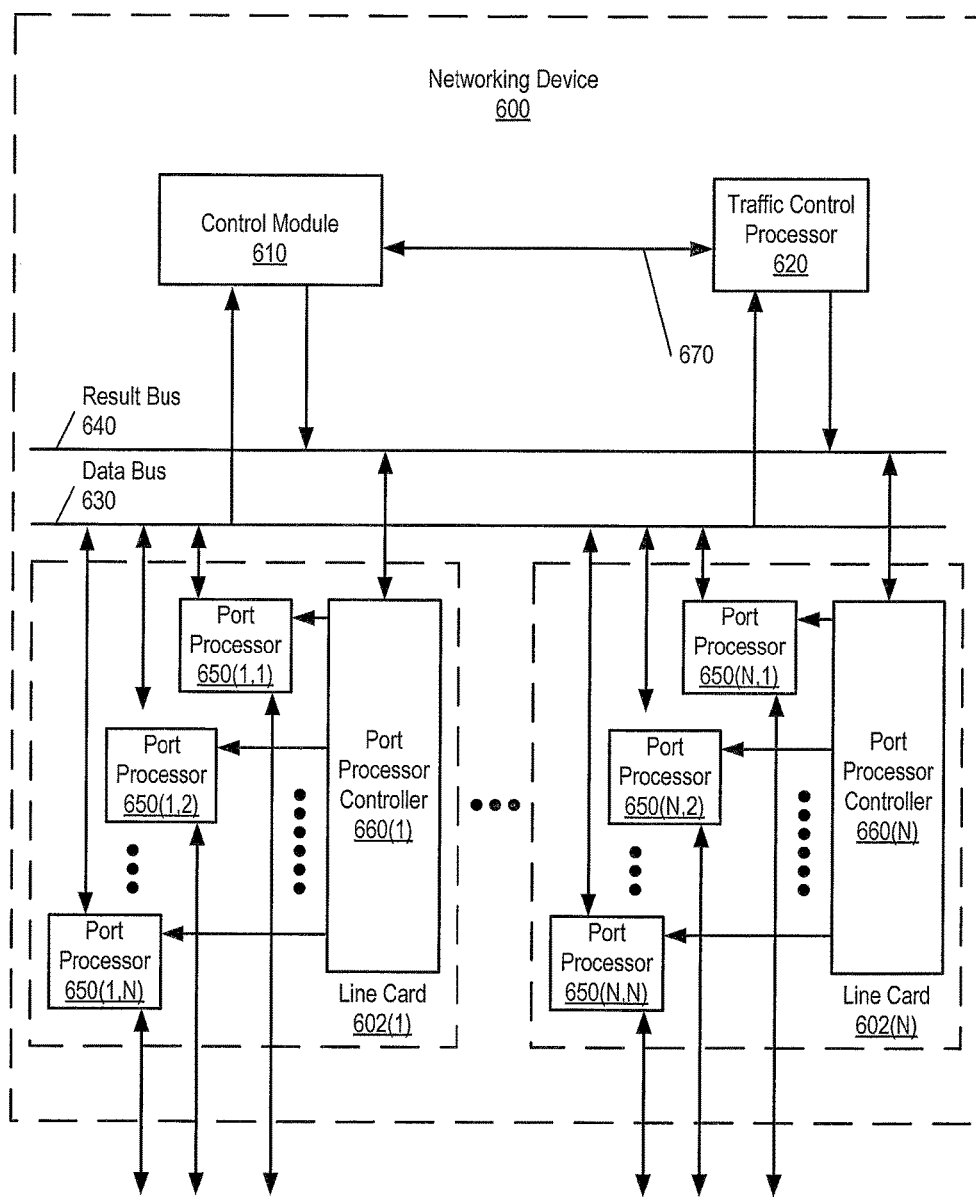
FIG. 6 is a block diagram illustrating components of an example networking device in which the present disclosure can be implemented, according to one embodiment.

FIG. 6 is a block diagram illustrating components of an example networking device 600, which depicts (at least in part) one configuration of a network device or a network routing element (e.g., a hub, router, switch, or similar device). In this depiction, networking device 600 includes a number of line cards (line cards 602(1)-602(N)) that are communicatively coupled to a control module 610 (which can include a forwarding engine, not shown) and a traffic control processor 620 via a data bus 630 and a result bus 640. Line cards 602(1)-(N) include a number of port processors 650(1,1)-650(N,N) which are controlled by port processor controllers 660(1)-660(N). It will also be noted that control module 610 and route processor 620 are not only coupled to one another via data bus 630 and result bus 640, but are also communicatively coupled to one another by a communications link 670. It is noted that in alternative embodiments, each line card can include its own forwarding engine.

When a message (e.g., a discovery message, offer message, and/or request message) is received by a network device or network routing element such as networking device 600, the message is identified and analyzed in the following manner. Upon receipt, a message (or some or all of its control information) is sent from one of the port processors 650(1,1)-650(N,N) at which the message was received to one or more of those devices coupled to data bus 630 (e.g., others of port processors 650(1,1)-650(N,N), a forwarding engine, and/or route processor 620). Handling of the message can be performance, for example, by a forwarding engine in accordance with the systems and methods disclosed herein. For example, a forwarding engine may determine that the message should be forwarded to one or more of port processors 650(1,1)-650(N,N). This can be accomplished by indicating to a corresponding one(s) of port processor controllers 660(1)-660(N) that the copy of the message held in the given one(s) of port processors 650(1, 1)-650(N,N) should be forwarded to the appropriate one of port processors 650(1,1)-650(N,N).

Networking device 600 can be used, for example, in the implementation of a network device (such as network device 114-2(2)) or a network routing element (such as, e.g., machine switch 111(1)) in control module 610, or in one or more of port processor controllers 660(1)-660(N) and/or in route processor 620, in order to implement the present disclosure. Although not shown, network device 600 can also be used to implement a routing protocol module and/or network reachability protocol module in control module 610, in one of port processor controllers 660(1)-660(N), and/or in route processor 620 (not shown).

An incoming message (e.g., a discovery message, offer message, and/or request message) can be provided to a network device or network routing element via a forwarding engine or port processor of a line card coupled to a port that received the incoming message. For instance, network device 114-2(2) and machine switch 111(1) can be configured to process the incoming message. Network device 600 can be configured to process the incoming message and to generate one or more outgoing messages (e.g., a discovery message, offer message, and/or request message), as described throughout this disclosure.

The outgoing message can be provided to a forwarding engine by a network device or a network routing device, which can determine that the outgoing message should be forwarded to one or more of port processors 650(1,1)-650 (N,N) that are configured to transmit the outgoing message toward the outgoing message's destination.

Figure 7:
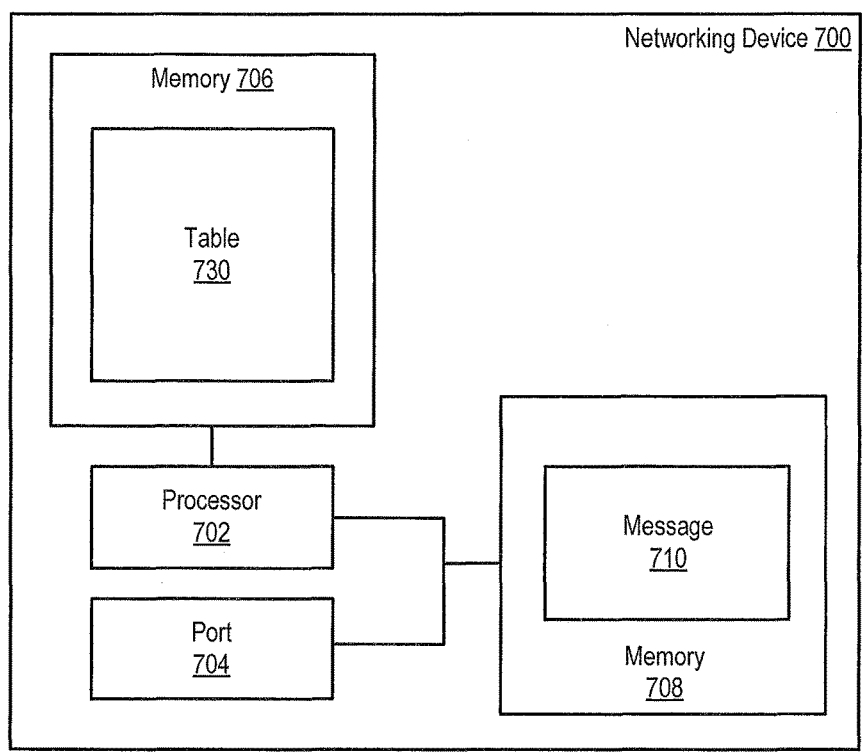
FIG. 7 is a block diagram illustrating components of an example networking device in which the present disclosure can be implemented, according to one embodiment.

FIG. 7 is a block diagram illustrating components of an example networking device 700, in which the networking device is configured as a network device (e.g., network device 114-2(2)) or a network routing element (e.g., machine switch 111(1)). As illustrated, networking device 700 includes one or more processors 702 (e.g., microprocessors, PLDs (Programmable Logic Devices), or ASICs (Application Specific Integrated Circuits)) configured to execute program instructions stored in memories 706 and/or 708, which are computer readable storage media. Memories 706 and 708 can include various types of RAM (Random Access Memory), ROM (Read Only Memory), Flash memory, MEMS (Micro Electro-Mechanical Systems) memory, and the like. Networking device 700 also includes one or more ports 704 (e.g., one or more hardware ports or other network interfaces that can be linked to other networking devices, hosts, servers, storage devices, or the like). Processor 702, port 704, and memories 706 and 708 are coupled to send and receive data and control signals by one or more buses or other interconnects.

In this example, program instructions executable to implement the systems and methods disclosed herein are stored in memory 706. Topology information and network reachability information can be stored in one or more tables 730.

Message 710 (e.g., a discovery message, offer message, and/or request message) is stored in memory 708. In one embodiment, message 710 can be received from port 704 (e.g., received from another networking device coupled to port 704), and can be stored in memory 708 before being provided forwarded to another networking device in accordance with the systems and methods of this disclosure. In one embodiment, outgoing message 710 can be generated and stored in memory 708 before being transmitted via port 704.

An Example Computing and Network Environment

As shown above, the present disclosure can be implemented using a variety of computer systems and networks. An example of one such computing environment is described below with reference to FIG. 8.

Figure 8:
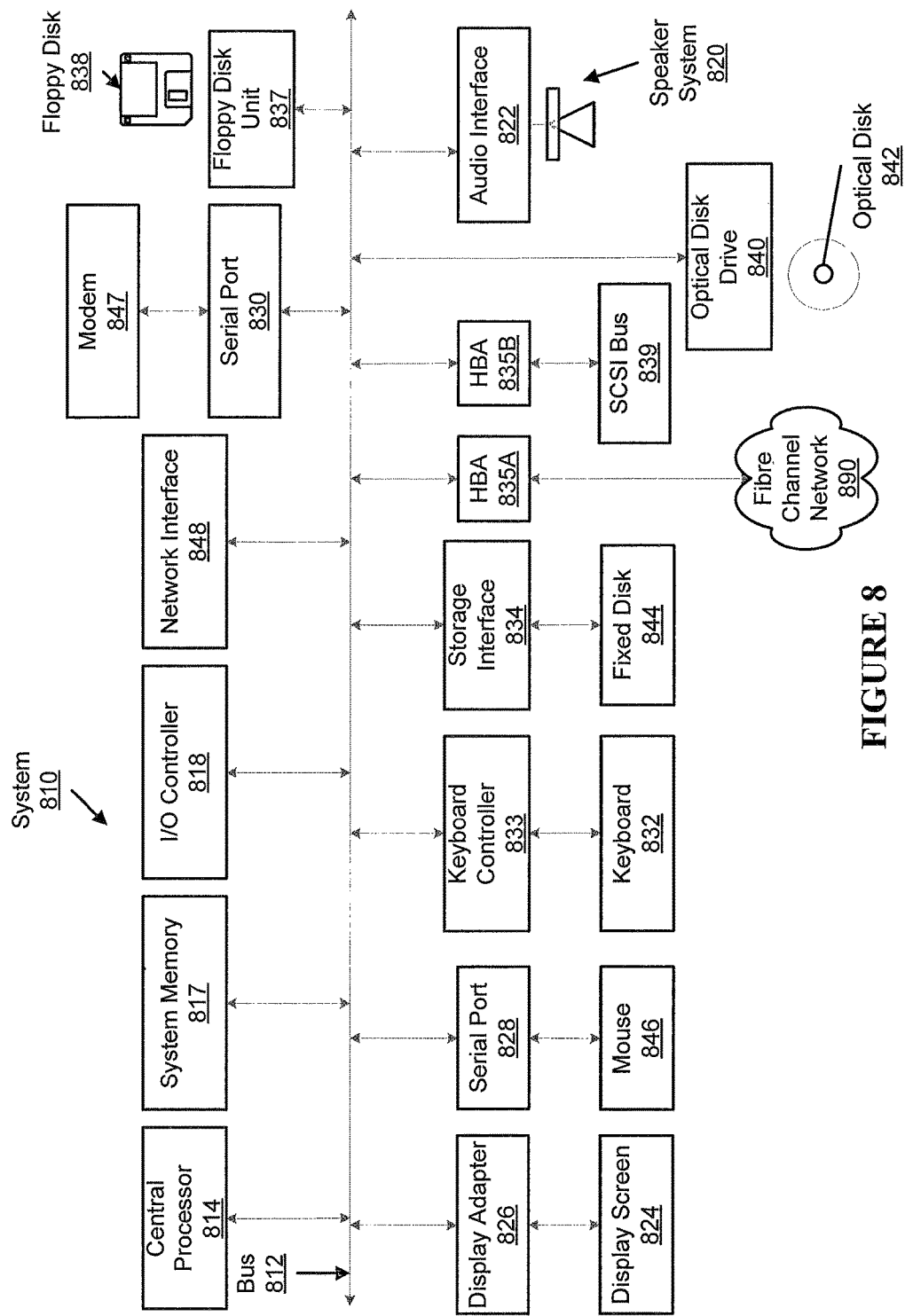
FIG. 8 is a simplified block diagram of a network architecture suitable for implementing aspects of the present disclosure, according to one embodiment.

FIG. 8 depicts a block diagram of a computer system 810 suitable for implementing aspects of the present disclosure. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 810 are generally stored on and accessed via a computer-readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer-readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. The operation of a computer system such as that shown in FIG. 8 is readily known in the art and is not discussed in detail in this application. Code to implement the present disclosure can be stored in computer-readable storage media such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the methods and systems described herein are described in connection with several embodiments, such embodiments are not intended to be limited to the specific forms set forth herein. On the contrary, such embodiments are intended to comprehend such alternatives, modifications, and equivalents as can be reasonably included within the scope of the appended claims.

What is claimed is:

1. A method comprising:
   receiving, at a current network routing element, a discovery message sent via a network, wherein
   the discovery message comprises identifying information that identifies a physical location of a first network device;
   modifying the identifying information in the discovery message, wherein
   the modifying comprises adding additional information to the identifying information to create modified identifying information,
   the additional information identifies a physical location of an immediately-preceding network routing element, and
   the modified identifying information comprises information describing at least the physical location of the first network device and the physical location of the immediately-preceding network routing element; and
   subsequent to the modifying, forwarding the discovery message, wherein
   the discovery message is configured to be forwarded to a network element,
   the network element is at a different network location than the first network device, the immediately-preceding network routing element, and the current network routing element, and the network element comprises at least one of a second network routing element or a server.

2. The method of claim 1, wherein
the first network device initiated the discovery message.

3. The method of claim 1, further comprising:
subsequent to the forwarding, receiving an offer message, wherein
the offer message comprises network name information,
the network name information indicates the physical location of the first network device within a topology of the network, and
the network name information further indicates the physical location of the current network routing element within the topology of the network.

4. The method of claim 3, wherein
the discovery message is a DHCP discovery message, and
the offer message is a DHCP offer message.

5. The method of claim 3, wherein
the network comprises a plurality of organizational levels,
the network name information comprises information describing each of the plurality of organizational levels.

6. The method of claim 3, further comprising:
forwarding the offer message to the first network device.

7. The method of claim 3, further comprising:
using the network name information to forward a packet received from the first network device, wherein
the packet is received from the first network device subsequent to receiving the offer message.

8. An apparatus comprising:
a processor;
a memory coupled to the processor and configured to store instructions executable by the processor, the instructions configured to perform operations comprising:
receiving, at a current network routing element, a discovery message sent via a network, wherein
the discovery message comprises identifying information that identifies a physical location of a first network device;
modifying the identifying information in the discovery message, wherein
the modifying comprises adding additional information to the identifying information to create modified identifying information,
the additional information identifies a physical location of an immediately-preceding network routing element, and
the modified identifying information comprises information describing at least the physical location of the first network device and the physical location of the immediately-preceding network routing element; and
subsequent to the modifying, forwarding the discovery message, wherein
the discovery message is configured to be forwarded to a network element,
the network element is at a different network location than the first network device, the immediately-preceding network routing element, and the current network routing element, and
the network element comprises at least one of a second network routing element or a server.

9. The apparatus of claim 8, wherein
the first network device initiated the discovery message.

10. The apparatus of claim 8, wherein the instructions are further configured to perform an additional operation comprising:
subsequent to the forwarding, receiving an offer message, wherein
the offer message comprises network name information,
the network name information indicates the physical location of the first network device within a topology of the network, and
the network name information further indicates the physical location of the current network routing element within the topology of the network.

11. The apparatus of claim 10, wherein
the discovery message is a DHCP discovery message, and
the offer message is a DHCP offer message.

12. The apparatus of claim 10, wherein
the network comprises a plurality of organizational levels,
the network name information comprises information describing each of the plurality of organizational levels.

13. The apparatus of claim 10, wherein the instructions are further configured to perform an additional operation comprising:
forwarding the offer message to the first network device.

14. The apparatus of claim 10, wherein the instruction are further configured to perform an additional operation comprising:
using the network name information to forward a packet received from the first network device, wherein
the packet is received from the first network device subsequent to receiving the offer message.

15. A computer program product comprising:
a plurality of program instructions, comprising
a first set of instructions, executable on a computer system, configured to
receive, at a current network routing element, a discovery message sent via a network, wherein
the discovery message comprises identifying information that identifies a physical location of a first network device;
a second set of instructions, executable on the computer system, configured to
modify the identifying information in the discovery message, wherein
modifying the identifying information comprises adding additional information to the identifying information to create modified identifying information,
the additional information identifies a physical location of an immediately-preceding network routing element, and
the modified identifying information comprises information describing at least the physical location of the first network device and the physical location of the immediately-preceding network routing element; and
a third set of instructions, executable on the computer system, configured to
subsequent to the modifying, forward the discovery message, wherein
the discovery message is configured to be forwarded to a network element,
the network element is at a different network location than the first network device, the immediately-preceding network routing element, and the current network routing element, and
the network element comprises at least one of a second network routing element or a server.

16. The computer program product of claim 15, wherein the first network device initiated the discovery message.

17. The computer program product of claim 15, wherein the plurality of program instructions further comprises a fourth set of instructions, executable on the computer system, configured to
- subsequent to forwarding the discovery message, receive an offer message, wherein
  - the offer message comprises network name information,
  - the network name information indicates the physical location of the first network device within a topology of the network, and
  - the network name information further indicates the physical location of the current network routing element within the topology of the network.

18. The computer program product of claim 17, wherein the discovery message is a DHCP discovery message, and the offer message is a DHCP offer message.

19. The computer program product of claim 17, wherein the network comprises a plurality of organizational levels, the network name information comprises information describing each of the plurality of organizational levels.

20. The computer program product of claim 17, wherein the plurality of program instructions further comprises
- a fifth set of instructions, executable on the computer system, configured to forward the offer message to the first network device; and
- a sixth set of instructions, executable on the computer system, configured to
  - use the network name information to forward a packet received from the first network device, wherein
    - the packet is received from the first network device subsequent to receiving the offer message.

* * * * *